United States Patent [19]
Scheer et al.

[11] Patent Number: 5,491,189
[45] Date of Patent: Feb. 13, 1996

[54] AQUEOUS VULCANIZING ADHESIVE

[75] Inventors: Hans Scheer; Wolf-Dieter Beiersdorf, both of Dusseldorf; Hans-Joachim Purps, Langenfeld, all of Germany

[73] Assignee: Henkel Kommanditgesellschaft auf Aktien, Duesseldorf, Germany

[21] Appl. No.: 187,667

[22] Filed: Jan. 26, 1994

Related U.S. Application Data

[63] Continuation of Ser. No. 775,949, Dec. 20, 1991, abandoned.

[30] Foreign Application Priority Data

Apr. 26, 1989 [DE] Germany .................... 39 13 691.4

[51] Int. Cl.$^6$ ..................... C09J 119/02
[52] U.S. Cl. ............ 524/259; 524/503; 524/519
[58] Field of Search ................ 524/259, 503, 524/519

[56] References Cited

U.S. PATENT DOCUMENTS 4,483,962  11/1984  Sadowski ................ 524/552
4,921,898  5/1990  Lenney et al. ............ 524/459

FOREIGN PATENT DOCUMENTS 0161373  11/1985  European Pat. Off. .

OTHER PUBLICATIONS

Billmeyer, Jr., F. W., *Textbook of Polymer Science*, 3d ed., John Wiley & Sons, New York, 1984, pp. 186–219.
Billmeyer, Jr., Fred W., *Textbook of Polymer Science*, 3rd Ed., John Wiley & Sons, New York, 1984, pp. 3–19.
*Hawley's Condensed Chemical Dictionary*, 12th Ed., Van Nostrand Reinhold Co., New York, 1993, p. 36.
*Hackh's Chemical Dictionary*, 4th Ed., McGraw–Hill Book Co., New York, 1969, p. 536.
*Encyclopedia of Polymer Science & Eng'g*, vol. 10, John Wiley & Sons, New York, 1987, pp. 9, 10.

*Primary Examiner*—Romulo H. Delmendo
*Attorney, Agent, or Firm*—Wayne C. Jaeschke; John Daniel Wood; Daniel S. Ortiz

[57] ABSTRACT

The adhesive strength of an aqueous binder dispersion consisting of: a halogenated copolymer which, in addition to other components, contains an alkylation-active monoalkenylaromatic alkyl halide; polyfunctional aromatic nitroso compounds; pigments; carbon black; anti-foaming agents; emulsifiers; and other additives, used for vulcanizing rubber onto substrates which are stable under the conditions of vulcanization, is improved, and the use of blocked isocyanates is avoided. This is achieved by adding, to increase the adhesive strength, homopolymers or copolymers of vinyl acetate that are also saponified to a certain extent, as well as, optionally, other customary additives.

21 Claims, No Drawings

AQUEOUS VULCANIZING ADHESIVE

This application is a continuation of U.S. patent application Ser. No. 07/775,949, now abandoned, filed Dec. 20, 1991.

This invention relates to an improved water-based binder for vulcanizing various types of rubber onto vulcanization-stable substrates.

It is becoming increasingly desirable to avoid the presence of volatile substances, such as solvents, in adhesives of the type in question. Accordingly, efforts have been made to formulate solventless systems. Thus, it is proposed in applicants' European patent 21 186 to synthesize a homopolymer or copolymer of vinylidene chloride and/or of butadiene/acrylonitrile copolymers, aromatic nitroso compounds, blocked isocyanates, polyvinyl pyrrolidone and other auxiliaries. Although products such as these were useful, there was still a need to improve bond strength with respect to all types of rubbers, including apolar rubbers, such as natural rubber, and to increase the economy of the binders.

A terpolymer latex consisting of a 2,3-dihalo-1,3-butadiene, an aromatic monoalkenyl alkyl halide and other monomers is known from DE-OS 34 25 381. This terpolymer may be processed together with polyfunctional aromatic nitroso compounds, the solids typically used in this field and a film-forming agent to form an adhesive composition. The film-forming agents mentioned also include homopolymers and copolymers of vinyl acetate. Although binders on this basis for vulcanizing rubber onto metals and the like produce useful results, it has now been found that major improvements can be obtained when the copolymers of vinyl acetate or the vinyl acetate are/is subjected to partial saponification to the corresponding polyvinyl alcohols.

Water-based binders for vulcanizing rubber onto vulcanization-stable substrates are already known from European patent 161 373. However, these known binders contain masked polyfunctional isocyanates. The use of masked isocyanates is undesirable because they can cause stability problems in storage. The known binders according to European patent 161 373 may also contain polyvinyl alcohol, although there is no reference to the type or quantity of polyvinyl alcohol used. The function of the polyvinyl alcohol in formulations such as these is merely to stabilize the constituents, i.e. polyvinyl alcohol is used as a stabilizer and not as a reactive component which contributes essentially to the composition of the binder.

Accordingly, the present invention relates to a water-based binder dispersion for vulcanizing rubber onto vulcanization-stable substrates consisting of a halogenated copolymer containing an alkylating aromatic monoalkenyl alkyl halide in addition to other constituents, polyfunctional aromatic nitroso compounds, pigments, carbon black, foam inhibitors, emulsifiers and other auxiliaries, characterized in that partially saponified homopolymers or copolymers of vinyl acetate and, if desired, other standard additives are present for increasing bond strength. Particular binder dispersions contain, based on the dispersion as the whole:

5 to 20% by weight of the halogen-containing copolymer, 2 to 20% by weight of the aromatic polynitroso compound, 1 to 15% by weight of the partly saponified homopolymer or copolymer of vinyl acetate, 0.2 to 15% by weight one or more auxiliaries selected from pigments, carbon black, foam inhibitors, and emulsifiers and balance to 100% by weight water.

The most important constituent of the binder according to the invention is a halogen-containing polymer based on an alkylating aromatic monoalkenyl alkyl halide. Preferred halogenated copolymers of this type are terpolymers of 60 to 97% by weight of at least one 2,3-dihalo-1,3-butadiene, 2 to 33% by weight of at least one aromatic monoalkenyl alkyl halide corresponding to the formula:

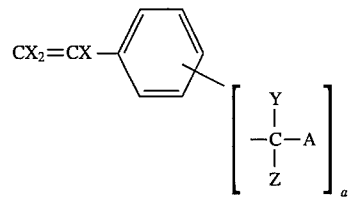

and

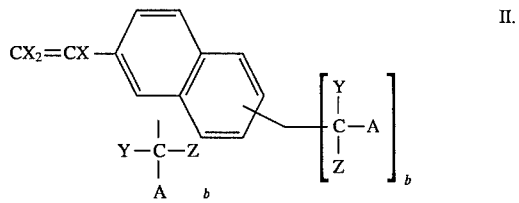

in which X is hydrogen, chlorine, bromine or iodine;

Y is hydrogen, chlorine or bromine; Z is hydrogen, chlorine or bromine and A is hydrogen, chlorine, bromine or a $C_{1-3}$ alkyl group, with the proviso that, of Y, Z or A, at least one is chlorine or bromine and, where A is an alkyl group, at least one of Y or Z is chlorine or bromine, and a=1 or 2 and b=0, 1 or 2, with the proviso that at least one b is at least 1;

and 0.5 to 10% by weight of at least one olefinically unsaturated monomer, the monomer being at least copolymerizable with the conjugated diene monomer and different from the aromatic alkyl halide.

With regard to the 2,3-dihalo-1,3-butadiene as conjugated diene monomers, which are known commercial products, the halogen substituent is selected from a group consisting of chlorine, bromine and iodine, chlorine presently being the preferred halogen substituent.

With regard to the mixture of at least two different unsaturated monomers which are copolymerizable at least with the conjugated diene monomer, it is pointed out that these monomers are selected from a first group, which consists of α-haloacrylonitrile, α-haloacrylic acid, α-haloacrylic acid ester, α-halovinyl ketone, α-halovinyl acetate, vinyl halide, vinylidene halide, styrene and aromatic monoalkenyl alkyl halides, and from a second group consisting of monomeric compounds containing at least one olefinically unsaturated group, the monomers of the second group being different from the monomers of the first group.

At present, compounds corresponding to formula I are preferred. Representative aromatic monoalkenyl alkyl halides include vinylbenzyl chloride, p-trichloromethyl vinylbenzene, p-(α-chloroethyl)-vinylbenzene, p-(α-chlorobutyl)-vinylbenzene, α-chlorovinylbenzene chloride, 2,3-di-(α-chloroethyl)-vinylbenzene, 4-chloromethyl vinyl naphthalene, the corresponding bromine and iodine analogs and the like. At present, the preferred aromatic monoalkenyl alkyl halide is vinylbenzyl chloride (4-chloromethyl vinylbenzene).

With regard to the second group of copolymerizable monomeric compounds, the ethylenically unsaturated compounds of the second group are those which can be polymerized by addition of unsaturated bonds, providing they do not crosslink, i.e. either only one unsaturated ethylene group is present in the compound or, where more than one group is present, they are conjugated as such or crosswise. The ethylenically unsaturated monomers which may be used in the terpolymers according to the invention are those which contain either one or several $CH_2=C<$ groups.

The ethylenically unsaturated compounds containing one or more $CH_2=C=$ groups include such compounds as styrene, p-chlorostyrene, 3,5-dichlorostyrene, p-methoxystyrene, acrylonitrile, methacrylonitrile, vinyl bromide, vinyl fluoride, vinyl iodide, vinyl acetate, vinyl propionate, vinyl butyrate, vinyl benzoate, vinylidene bromide, vinylidene chlorofluoride, methyl methacrylate, butyl methacrylate, methacrylamide, vinyl methyl ketone, vinyl pyridine, vinyl carbazole, vinyl methyl ether, isobutylene, ethylene, vinyl chloride, vinylidene chloride, alkyl acrylates, including methyl, ethyl, propyl, butyl and octyl acrylates, acrylic acid and methacrylic acid and other similar monoolefinic polymerizable compounds. Other unsaturated compounds containing more than one olefinic group which may be copolymerized to form the terpolymers according to the invention are conjugated dienes, such as 1,3-butadiene, isoprene and other 1,3-butadiene hydrocarbons, chloroprene and also 3-cyano-1,3-butylidene, trienes, such as myrcene, and compounds containing olefinic and acetylenic bonds, such as vinyl acetylene, vinyl ethynyl, diethyl carbonyl and the like.

The terpolymer latex used in accordance with the invention may be prepared by emulsion polymerization of the halogenated conjugated diene with at least two different unsaturated comonomers in an aqueous medium in the presence of an ionic or a mixed ionic/nonionic surface-active system, ionic surface-active systems presently being preferred. It has been found that the terpolymer products which are most suitable for carrying out the invention contain 60 to 97% by weight, preferably 75 to 97% by weight and optimally 93 to 97% by weight halogenated conjugated diene and, in addition, 2 to 33% by weight, preferably 3 to 25% by weight and optimally 3 to 7% by weight of the monomer of the first group and 0.5 to 10% by weight and preferably 2 to 7% by weight of the monomer of the second group. Of particular value are terpolymer products which have been produced from 2,3-dihalo-1,3-butadiene, more particularly 2,3-dichloro-1,3-butadiene, in a quantity of 80 to 95% by weight, based on polymer, aromatic monoalkenyl alkyl halides, more particularly vinylbenzyl chloride, in quantities of 2 to 10% by weight and also olefinically unsaturated monomers, more particularly monomers containing at least one —COOH group, acrylic acid, methacrylic acid and/or 2-hydroxyethyl methacrylate monophosphate in quantities of 2 to 10% by weight. Part of the aromatic monoalkenyl alkyl halides, for example 10 to 90 mol-%, may also be saponified to the corresponding hydroxyalkyl compounds.

The emulsion polymerization is carried out in a closed vessel in which space that is not occupied by the reaction mixture is kept free from oxygen, preferably a layer of inert gas, such as nitrogen, because the induction period for the polymerization reaction is prolonged by the presence of oxygen and because it is desirable to carry out the reaction in the substantial absence of oxygen. Generally speaking, the emulsion polymerization is carried out by mixing the monomeric constituents with one another, emulsifying the mixture and subjecting the emulsion to moderate polymerization conditions until substantially the entire monomeric batch is polymerized. However, for various practical reasons which need not be discussed here, it has been found that the emulsion polymerization of the tertiary monomeric system is carried out more effectively by a semi-continuous process which comprises adding an emulsion of a halogenated conjugated diene and the monomers of the first and second group at constant speed to a polymerization zone containing an aqueous solution or dispersion of the polymerization initiator. The polymerization conditions are otherwise substantially the same as in batch polymerization processes and need not be discussed here. The polymerization reaction is exothermic and the reaction temperature should be kept below about 75° C. and preferably below about 60° C. Virtually any catalyst or initiator which forms free radicals, including the known redox catalyst systems, such as ammonium persulfate/sodium metabisulfite, benzyl peroxide, hydrogen peroxide, di-t-butyl peroxide, azo-bis-(isobutyronitrile), alkali metal persulfates and alkyl metal ammonium perborates, may be used in the copolymerization reaction to ensure rapid initiation of the reaction and reproducible results. After the polymerization reaction, unreacted volatile constituents may be removed by vacuum treatment at elevated temperature or by steam distillation, the particular method being a matter of choice.

The choice of the surface-active agent is of major importance to the production of a latex which ensures satisfactory adhesion. It has been found that anionic surfactants or mixtures of anionic and nonionic surfactants have to be used, the mixtures presently being preferred. Whereas cationic surfactants as such are effective emulsifiers, their use in the production of the elastomeric terpolymer latex according to the invention either individually or in combination with either an anionic or a nonionic surfactant or with both adversely affects the adhesive properties. The surface-active systems are used in quantities of 0.01 to 15% by weight and preferably in quantities of 1 to 10% by weight, based on the weight of the monomers used. At present, it is preferred to use a mixed anionic/nonionic surface-active system with a ratio of anionic to nonionic surfactant of 1.2 to 2.1:1 and preferably 1.3 to 2.0:1. Representative anionic surfactants are carboxylates, such as fatty acid soaps of lauric, stearic and oleic acid and also acyl derivatives of sarcosine, such as methyl glycine; sulfates, such as sodium lauryl sulfate; sulfatized natural oils and esters, such as turkey red oil and alkylaryl polyether sulfates; alkylaryl polyether sulfonates; isopropyl naphthalene sulfonates and sulfosuccinates and also sulfosuccinamates; phosphate esters, such as partial esters of complex phosphates with short-chain fatty alcohols; and orthophosphate esters of polyethoxylated fatty alcohols. Representative nonionic surfactants include ethoxylated (ethylene oxide derivatives), monohydric and polyhydric alcohols, ethylene oxide/propylene oxide block copolymers; esters, such as glycerol monostearate; dehydration products of sorbitol, such as sorbitan monostearate and polyethylene oxide sorbitan monolaurate; and amines, such as lauric acid, isopropenyl halide. At present, a 1.8:1 mixture of sodium dodecyl diphenyl ether disulfonate as the anionic surfactant and nonylphenol polyethylene glycol as the anionic surfactant is preferred. Anionic and anionic/nonionic surface-active systems which have to be used in accordance with the invention are described in detail in Emulsions: Theory and Practice, by Paul Becher, Chapter 6 (Reinhold Publishing Corporation, New York, 1965), and in McCutcheon's Detergents and Emulsifiers, 1972 Annual.

The terpolymer latex obtained in accordance with the invention by the emulsion copolymerization of halogenated dienes and unsaturated monomers of the first and second group generally has a pH value in the range from 2 to 3. It is possible, but not preferred, to adjust the pH to a value in the range from about 4 to 11 and preferably 6 to 10 using acid acceptors or buffers, such as zinc oxide, dibasic lead phosphate, sodium acetate/acetic acid mixtures or the like, dibasic lead phosphate presently being the preferred acid acceptor. Stabilizers of this type are of course used in a quantity sufficient to maintain the desired pH value because excesses can be problematical.

The binders according to the invention contain aromatic nitroso compounds as another key constituent. The aromatic nitroso compounds which are suitable for carrying out the invention are any aromatic hydrocarbons, such as benzene, naphthalene, anthracene and diphenyl, which contain at least two nitroso groups attached directly to non-adjacent ring carbon atoms. Nitroso compounds such as these are known as aromatic poly-C-nitroso compounds containing 1 to 3 aromatic nuclei, including aromatic nuclei fused to one another containing 2 to 6 nitroso groups which are attached directly to non-adjacent ring carbon atoms. At present, preferred poly-C-nitroso materials are aromatic nitroso compounds, more particularly dinitrosobenzenes and dinitrosonaphthalenes, such as meta- or para-dinitrosobenzenes and meta- or para-dinitrosonaphthalenes. The ring hydrogen atoms of the aromatic nucleus may be replaced by alkyl, alkoxy, cycloalkyl, aryl, arylnitroso, halogen and similar groups. The presence of such substituents at the aromatic nucleus has little effect on the activity of the poly-C-nitroso compounds according to the invention. As far as it has hitherto been possible to tell, there are no limitations in regard to the nature of the substituent which may be organic or inorganic. Accordingly, any reference to the "aromatic" poly-C-nitroso comopound, "benzene" or "naphthalene" is understood to encompass both substituted and unsubstituted nitroso compounds, etc., unless otherwise stated.

A partial non-limiting list of suitable poly-C-nitroso compound suitable for carrying out the invention includes m-dinitrosobenzene, p-dinitrosobenzene, m-dinitrosonaphthalene, p-dinitrosonaphthalene, 2,5-dinitroso-p-cymol, 2-methyl-1,4-dinitrosobenzene, 2-methyl-5-chloro-1,4-dinitrosobenzene, 2-fluoro-1,4-dinitrosobenzene, 2-methoxy-1,3-dinitrosobenzene, 5-chloro-1,3-dinitrosobenzene, 2-benzyl-1,4-dinitrosobenzene and 2-cyclohexyl-1,4-dinitrosobenzene.

The binders according to the invention contain partly saponified homopolymers or copolymers of vinyl acetate as another characteristic constituent. Compounds such as these are referred to herein as polyvinyl alcohol. They are used in quantities of 1 to 15% by weight and preferably in quantities of 1.5 to 5% by weight, based on binder. The degree of saponification of the polyvinyl alcohols used, i.e. the percentage number of hydroxyl groups, based on the acetate groups originally present, is between 40 and 98%. Particularly favorable results are obtained with degrees of saponification of 80 to 90%.

Suitable polyvinyl alcohols are derived on the one hand from vinyl acetate homopolymers and on the other hand from copolymers thereof. Suitable copolymers are copolymers of vinyl acetate with olefins, halogenated olefins, vinyl ethers, olefinically unsaturated mono- or dicarboxylic acids and/or—to a limited extent—esters thereof. In addition to the saponification products of polyvinyl acetate, therefore, preference is attributed to saponification products of polyvinyl acetate-co-vinyl butyrate, saponification products of vinyl acetate/ethylene/vinyl chloride copolymers, saponification products of vinyl acetate/acrylates, of vinyl acetate/maleic acid dibutyl ester copolymers, of vinyl acetate/styrene acrylate copolymers and of vinyl acetate/methyl acrylate copolymers. Copolymers of vinyl acetate, ethylene and vinylidene chloride having the degrees of saponification mentioned are also suitable. In the copolymers mentioned, the vinyl acetate content in mol-% of the copolymer as a whole is more than 30 mol-%, preferably more than 50 mol-% and, more preferably, more than 70 mol-%.

Although no theoretical explanation for the effects observed in accordance with the invention can be given at the present time, the hydroxyl groups of the polyvinyl alcohols which must be present in accordance with the invention would appear to react with the other constituents during establishment of the bond under vulcanization conditions.

According to the invention, favorable results are obtained with polyvinyl alcohols having a molecular weight in the range from 14,000 to 100,000. It has been found in this regard that the molecular weight is only of minor importance to the result obtained. However, the expert can increase the viscosity by increasing the molecular weight and, hence, can vary the processing properties of the binder. However, it has been found that binders based on relatively high molecular weight polyvinyl alcohols show better adhesion of the uncured binder film to metals or primers which is often desirable for automated application processes. Binders in which the polyvinyl alcohol has molecular weights in the range from 30,000 to 75,000 have proved to be successful for this purpose, so that this molecular weight range may be regarded as preferred.

Quantitatively, the binders according to the invention preferably contain 5 to 20% by weight halogenated polymer, 2 to 20% by weight of at least one polyfunctional aromatic nitroso compound, 0.2 to 15% by weight polyvinyl alcohols and 0.2 to 6% by weight auxiliaries. The balance to 100% by weight is water. The total solids content of the preparations is between 10 and 50% by weight and preferably between 20 and 30% by weight.

The dispersions according to the invention may also contain typical adhesion-improving fillers, more particularly carbon black in quantities of 0.2 to 10% by weight, zinc oxide in quantities of 0.1 to 10% by weight or, if desired, basic lead phosphite and the like. Pigments may also be incorporated. Another advantage of the binders according to the invention is that the masked isocyanate compounds, which are described as essential in preparations of the type in question, for example in the binder according to DE-PS 29 23 651 and in German patent application DE 34 00 851, need not be used. Technically, the presence of masked isocyanates is generally critical to the stability of the binders, particularly at elevated temperatures such as can occur in warehouses in summer. To prepare the binders according to the invention, a latex of the halogenated polymer based on an alkylating aromatic monoalkenyl alkyl halide is initially prepared by emulsion copolymerization. The other constituents and, if desired, water are added to the latex. After preliminary dispersion in a suitable unit, the latex is then ground in a ball mill to a fineness of less than 2 mils.

The water-based binders according to the invention are suitable for bonding vulcanizable elastomers to a number of substrates, including for example numerous metals, such as iron, stainless steel, lead, aluminium, copper, brass, bronze, monel metals, nickel, zinc and the like. They are also suitable for treated metals, such as phosphated steel, galvanized steel, and may also be used for glass and ceramic materials and for high-melting plastics, such as aramide fibers for example. Emphasis is placed on their favorable effect in particular in the vulcanization of polar rubbers, for example nitrile rubber, onto aramide fibers or metals.

The binders are conventionally applied to the substrate surfaces, for example by dip coating, spray coating, brush coating and the like. It may be advisable in some cases to carry out a pretreatment with a primer of chlorinated rubber, phenolic resin or the like. After coating, the substrate surfaces are left to dry before being fitted together. After the surfaces have been fitted together, the composite structures are conventionally heated to bring about vulcanization.

EXAMPLES

In the tests, the product according to the invention was investigated for its basic adhesive properties and tested for comparison with known products.

Standard test methods, such as ASTM-D 429, Method A or Method B, were used for the tests.

The metals were pretreated in the usual way.

Vulcanization was carried out in a press under the vulcanization conditions indicated in the Tables. After vulcanization, all the composites were stored for approximately 24 hours and then subjected to the individual tests.

Of the formulations listed in Table 1, Nos. 1 to 3 correspond to the water-based binders according to the invention while formulation No. 4 is a product corresponding to EP 161 373.

For all the tests, the water-based binder was applied over a primer (based on a phenolic resin).

Standard adhesion and corrosion test

This test determines the shear strength of the bond and, at the same time, evaluates the failure pattern formed.

In the corrosion test, the composite elements are stored for 2 h in water at 95° to 98° C. while a load of 2 kg/in is applied to the bond line.

The results expressed as 100 R (100 R= 100% failure in the rubber) in Table 2 show satisfactory adhesion and strength both in the adhesion test and in the corrosion test for all the rubber mixtures used.

Tensile test

The test according to ASTM-D 429, Method A, determines the tensile shear strength of a rubber/metal composite.

The result of this test (see Table 3) shows that 100% failure in the rubber is always obtained in the tensile test as well, irrespective of the rubber mixture. The differences between the strength values are due to mixing.

Preheating resistance

To test preheating resistance, the coated test plates are placed in the vulcanizing mold for the preheating time at 153° C. and are then directly vulcanized onto the NR mixture.

The failure patterns indicated in Table 4 show a distinctly better preheating resistance for binder No. 3 than for binder No. 4. Even after heating for only 8 minutes, binder No. 4 is no longer able to establish a firm bond. Binder No. 3 performs satisfactorily after preheating for 14 minutes.

Hydrolysis stability

The automotive industry requires a resistance to GLYSANTIN®/water (1:1) at 135° C. of more than 42 hours for EPDM composite elements used in the vicinity of radiators.

A resistance to damper liquid (GLYKOSAFE®610, a product of BASF) of 7 days at 130° C. is required for engine bearings (NR composite).

Different EPDM or NR mixtures were bonded with binders Nos. 3 and 4 and subjected to the described stability tests.

Table 5 shows the distinct superiority of binder No. 3 to binder No. 4.

Boiling water resistance

In addition to the hydrolysis tests mentioned, the boiling water test (as already described) clearly shows to what extent a safe bond is established.

As shown in Table 6, all NR mixtures are bonded so firmly with binder No. 3 that satisfactory boiling water resistance is achieved. Binder No. 4 fails completely.

The described tests showed that only limited adhesion and very poor stability are achieved with the hitherto known binder according to European patent 0 161 373.

In contrast, the binder according to the invention performs satisfactorily in all the tests. The resistance to GLYSANTIN® and GLYKOSAFE®610 achieved with the binder according to the invention is particularly remarkable.

In addition, the binder according to the invention is also satisfactory in regard to spraying behavior, spray pattern, sedimentation or substrate adhesion and stripping resistance.

Binders Nos. 1 and 2 in Table 1 correspond in their adhesion and resistance behavior to binder No. 3 which has been described in detail. They are only inferior to binder No. 3 in viscosity or thixotropic behavior so that a broad account is not necessary.

The chemical names of the commercial products are given after the Tables.

| Formulation of the NR mixture | |
|---|---|
| Mixture constituents | |
| NR SMR 5 CV 60 | 100 parts |
| Stearic acid | 2 parts |
| VULKANOX ® HS | 1 part |
| ZnO RS | 10 parts |
| Pine tar | 2 parts |
| CK 3 | 25 parts |
| VULKACIT ® L | 0.33 part |
| VULKACIT ® DM | 0.58 part |
| Sulfur | 2.75 parts |

Vulcanization: 153° C./10 mins.

| Formulation of the SBR mixture | |
|---|---|
| Mixture constituents | |
| BUNA HUELS ® 1500 | 100 parts |
| Stearic acid | 1 part |
| ZnO RS | 5 parts |
| CORAX ® 3 | 50 parts |
| PARAFLUX ® | 8 parts |
| VULKACIT ® CZ | 0.95 part |
| Sulfur | 1.6 parts |

Vulcanization: 153° C./30 mins.

| Formulation of NBR mixture | |
|---|---|
| Mixture constituents | |
| PERBUNAN ® N 3807 | 100 parts |
| HYCAR ® 1312 | 10 parts |
| ALNOVOL ® Ph 809 | 15 parts |
| VULKANOX ® MB | 1 part |
| VULKANOX ® AP | 1 part |
| ZnO active | 5 parts |
| AROVEL ® FEF | 20 parts |
| REGAL ® R | 35 parts |

-continued

Formulation of NBR mixture

| Mixture constituents | |
|---|---|
| Stearic acid | 1 part |
| WINNOFIL S | 20 parts |
| VULKACIT CZ | 1 part |
| VULKACIT Thiuram | 3 parts |
| Sulfur | 0.2 part |

Vulcanization: 153° C./15 mins.

Formulation of the IIR mixture

| Mixture constituents | |
|---|---|
| ESSO-BUTYL ® 325 | 100 parts |
| Stearic acid | 1 part |
| ZnO RS | 5 parts |
| CORAX ® 3 | 50 parts |
| VULKACIT ® DM | 1 part |
| ETHYL-TELLURAC | 1.5 parts |
| Sulfur | 1 part |

Vulcanization: 160° C./30 mins.

Formulation of the CR mixture

| Mixture constituents | |
|---|---|
| BAYPREN ® 110 | 50 parts |
| BAYPREN ® 210 | 50 parts |
| Stearic acid | 0.5 part |
| MgO light | 4 parts |
| VULKANOX ® MB | 0.5 part |
| VULKANOX ® 4010 NA | 1 part |
| Antiozonant AFD | 0.5 part |
| Antiozonant wax 111 | 1 part |
| THERMAX ® MT | 140 parts |
| INGRAPLAST ® S | 10 parts |
| RHENOSORB ® C | 5 parts |
| ZnO RS | 5 parts |
| VULKACIT Thiuram ® MS | 1 part |
| VULKACIT ® DOTG | 1 part |
| Sulfur | 0.5 part |

Vulcanization: 160° C./20 mins.

Formulation of EPDM mixture No. 1

| Mixture constituents | |
|---|---|
| KELTAN ® 512 | 100 parts |
| Stearic acid | 0.5 part |
| VULKANOX ® HS | 1.5 parts |
| ZnO RS | 5 parts |
| CORAX ® 3 | 90 parts |
| GULF SECURITY ® 320 | 50 parts |
| BDMA ® | 1.5 parts |
| PERKADOX ® 14/40 | 8.5 parts |

Vulcanization: 160° C./25 mins.

TABLE 1

| Binder formulation | | 1 | 2 | 3 |
|---|---|---|---|---|
| RD 3379-30 (1) | (Lord Corp.) | 34.6% | 34.6% | 34.6% |
| RD 3435-49 (100%) (2) | (Lord Corp.) | 7.3% | 7.3% | 7.3% |
| Z 930 (3) | (Henkel) | — | — | — |
| MOWIOL ® 18/88 (4) | (Hoechst) | 0.2% | 0.9% | 1.9% |
| MOWILITH ® DM 120 (50%) (5) | (Hoechst) | 3.4% | 2.0% | — |
| Carbon black, CORAX 3 | (Degussa) | 1.8% | 1.8% | 1.8% |
| Zinc oxide, HANSA EXTRA ® | (Lehm & Voss) | 0.9% | 0.9% | 0.9% |
| Water (dist.) | | 51.8% | 52.5% | 53.5% |

(1) Terpolymer latex of 2,3-dichloro-1,3-butadiene/vinylbenzyl chloride/acrylic acid
(2) p-Dinitrosobenzene
(3) Masked isocyanate of Rütapox 0300 with Desmodur 44?
(4) Polyvinyl alcohol
(5) Copolymer dispersion of vinyl acetate/ethylene/vinyl chloride, partly saponified
A binder according to EP 161 373 was used for comparison (4)

TABLE 2

Standard adhesion and corrosion test

Substrate: steel
Test method: ASTM-D 429, Method B
Binder: No. 3 over primer

| | Adhesion test | | |
|---|---|---|---|
| Mixture | Adhesion value | Failure pattern | Boiling water test |
| NR | 42 daN/in | 100 R | 100 R |
| SBR | 80 daN/in | 100 R | 100 R |
| CR | 35 daN/in | 100 R | 100 R |
| EPDM | 55 daN/in | 100 R | 100 R |
| IIR | 48 daN/in | 100 R | 100 R |
| NBR | 45 daN/in | 100 R | 100 R |

Key to raw materials

| | |
|---|---|
| VULKACIT ® L | (zinc-N-dimethyl dithiocarbamate) |
| VULKACIT ® DM | (dibenzothiazyl disulfide) |
| VULKACIT ® CZ | (benzothiazyl-2-cyclohexyl sulfinamide) |
| VULKACIT ® Thiuram MS | (tetramethyl thiuram monosulfide) |
| VULKACIT ® Thiuram | (tetramethyl disulfide) |
| VULKACIT ® DOTG | (di-o-tolyl guanidine) |
| ETHYL-TELLURAL ® | (tellurium diethyl dithiocarbamate) |
| VULKANOX ® HS | (2,2,4-trimethyl-1,2-dihydroquinoline, polymeric) |
| VULKANOX ® MB | (2-mercaptobenzimidazole) |
| VULKANOX ® 4010 NA | (N-isopropyl-N'-phenyl-p-phenylenediamine) |
| VULKANOX ® AP | (condensation product of aldol/naphthylamine) |
| Antiozonant wax III | (mixture of various hydrocarbons) |
| Antiozonant AFD | (unsaturated ether) |
| CORAX ® 3 | (carbon black ASTM N 330) |
| CK ® 3 | (carbon black ASTM S 300) |
| AROVEL ® FEF | (carbon black ASTM N 550) |
| REGAL ® R | (carbon black ASTM N 774) |
| THERMAX ® MT | (carbon black ASTM N 990) |
| GULF SECURITY ® 320 | (paraff. mineral oil) |
| Pine tar | (pinewood tar) |
| PARAFLUX ® | (saturated polymerized petroleum hydrocarbons) |
| INGAPLAST ® S | (naphthenic mineral oil) |
| WINNOFIL ® S | (calcium carbonate coated with calcium stearate) |
| RHENOSORB ® C | (calcium oxide) |
| BDMA ® | (butyl glycol dimethacrylate) |
| PERKADOX ® 14/40 | (1,3-bis-(t-butylperoxyisopropyl)-benzene) |

TABLE 3

Tensile test

Substrate: steel
Test method: ASTM-D 429, Method A
Binder: No. 3 over primer

| Mixture | Adhesion Value | Failure pattern |
|---|---|---|
| NR | 6.2 MPa | 100 R |
| SBR | 10.2 MPa | 100 R |
| CR | 5.8 MPa | 100 R |
| EPDM | 4.9 MPa | 100 R |
| IIR | 8.9 MPa | 100 R |
| NBR | 6.4 MPa | 100 R |

TABLE 4

Preheating resistance

Substrate: steel
Test method: ASTM-D 429, Method B
Binder: either No. 3 or No. 4 over primer
Binder layer thickness: approx. 18–20μ
Mixture: NR
Vulcanization: 153° C.

| Preheating time | Binder No. 3 | Binder No. 4[+] |
|---|---|---|
| 8 mins. | 100 R | 90 R |
| 10 mins. | 100 R | 40 R |
| 12 mins. | 100 R | 10 R |
| 14 mins. | 100 R | 0 R |
| 16 mins. | 80 R | 0 R |

[+]Comparison Example according to EP 161 373

TABLE 5

Hydrolysis stability

Substrate: steel
Test method: ASTM-D 429, method B
Binder: No. 3 or No. 4 over primer

GLYSANTIN ®/water (1:1), 3 days/135° C.

| Mixture | Binder No. 3 | Binder No. 4[+] |
|---|---|---|
| EPDM No. 1 | 100 R | 10 R |
| EPDM No. 2 | 100 R | 0 R |
| EPDM No. 3 | 100 R | 0 R |

GLYKOSAFE ® 610, 7 days/130° C.

| Mixture | Binder No. 3 | Binder No. 4 |
|---|---|---|
| NR No. 1 | 100 R | 90 R |
| NR No. 2 | 100 R | 90 R |
| NR No. 3 | 100 R | 20 R |
| NR No. 4 | 100 R | 30 R |

[+]Comparison Example according to EP 161 373

TABLE 6

Boiling water resistance

Substrate: steel
Test method: ASTM-D 429, method B
Binder: No. 3 or No. 4 over primer

| Mixture | Binder No. 3 | Binder No. 4[+] |
|---|---|---|
| NR No. 1 | 100 R | 0 R |
| NR No. 2 | 100 R | 0 R |
| NR No. 3 | 100 R | 0 R |

TABLE 6-continued

Boiling water resistance

Substrate: steel
Test method: ASTM-D 429, method B
Binder: No. 3 or No. 4 over primer

| Mixture | Binder No. 3 | Binder No. 4[+] |
|---|---|---|
| NR No. 4 | 100 R | 0 R |

[+]Comparison Example according to EP 161 373

We claim:

1. A water-based binder dispersion for vulcanizing rubber onto vulcanization-stable substrates, said dispersion consisting essentially of water and:

(A) a halogen-containing copolymer consisting of polymerized units of:
60 to 97% by weight of at least one 2,3-dihalo-1,3-butadiene;
2 to 33% by weight of at least one aromatic monoalkenyl alkyl halide corresponding to the formula:

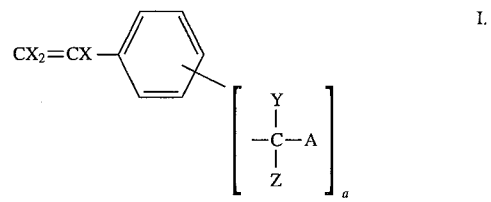

I.

or

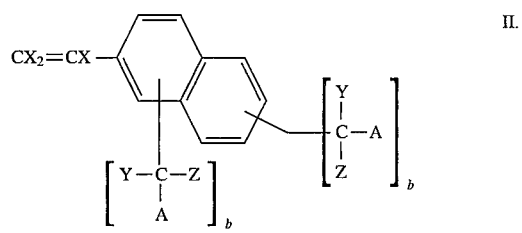

II.

in which X is selected from the group consisting of hydrogen, chlorine, bromine and iodine; Y is selected from the group consisting of hydrogen, chlorine and bromine; Z is selected from the group consisting of hydrogen, chlorine and bromine and A is selected from the group consisting of hydrogen, chlorine, bromine and a $C_{1-3}$ alkyl group, with the proviso that, of Y, Z and A, at least one is chlorine or bromine and, where A is an alkyl group, at least one of Y and Z is chlorine or a bromine, and a=1 or 2 and b=0, 1 or 2, with the proviso that at least one b is at least 1; and
0.5 to 10% by weight of at least one olefinically unsaturated monomer which is at least copolymerizable with the conjugated diene monomer and different from the aromatic monoalkenyl alkyl halide, (B) an aromatic polynitroso compound containing at least two nitroso groups attached directly to non-adjacent ring carbon atoms, (C) one or more auxiliaries selected from the group consisting of pigments, carbon black, foam inhibitors, and emulsifiers, and (D) a partly saponified copolymer of vinyl acetate that contains polymerized units of one or more comonomers selected from the group consisting of olefins, halogenated olefins, vinyl ethers, olefinically unsaturated carboxylic acids, esters of olefinically unsaturated carboxylic acids, olefinically unsaturated dicarboxylic acids, and esters of olefinically unsaturated dicarboxylic acids, said water-based binder dispersion being free from masked polyisocyanates.

2. The binder dispersion of claim 1, which, based on the dispersion as a whole, contains:
   5–20% by weight of the halogen-containing copolymer,
   2–20% by weight of the aromatic polynitroso compound.
   1–15% by weight of the partly saponified copolymer of vinyl acetate,
   0.2–15% by weight of one or more auxiliaries selected from the group consisting of pigments, carbon black, foam inhibitors and emulsifiers and
   Balance to 100% by weight water.

3. The binder dispersion of claim 1 wherein from 40–98% of the acetate groups originally present in the copolymer of vinyl acetate have been saponified to alcohol groups.

4. The binder dispersion of claim 1 wherein the halogen-containing polymer contains polymerized units of monomers bearing carboxylic acid groups 5. The binder dispersion of claim 1 wherein the halogen-containing polymer consists of
   80–95% by weight polymerized units of 2,3-dihalo-1,3-butadiene monomers
   2–10% by weight monomers selected from a group consisting of acrylic acid, methacrylic acid and mixtures thereof, and
   2–10% by weight polymerized units of vinyl benzylchloride.

6. The binder dispersion of claim 1 wherein the halogen-containing polymer is partly saponified to the corresponding hydroxyalkyl compound.

7. The binder dispersion of claim 1 wherein a dinitrosobenzene is used as the aromatic polynitroso compound.

8. The binder dispersion of claim wherein 1,3-dinitrosobenzene, 1,4-dinitrosobenzene or mixtures thereof are used as the aromatic polynitroso compounds.

9. The binder dispersion of claim 1 wherein the halogen-containing polymer contains from 80–95% by weight of polymerized units of 2,3-dichloro-1,3-butadiene.

10. The binder dispersion of claim 1 wherein from 80–90% of the acetate groups originally present in the copolymer of vinyl acetate have been saponified into alcohol groups.

11. The binder dispersion of claim 2 wherein from 80–90% of the acetate groups originally present in the copolymer of vinyl acetate have been saponified to alcohol groups.

12. A water-based binder dispersion for vulcanizing rubber onto vulcanization-stable substrates, said dispersion consisting essentially of water and:
   (A) a halogen-containing copolymer consisting of polymerized units of:
       60 to 97% by weight of at least one 2,3-dihalo-1,3-butadiene;
       2 to 33% by weight of at least one aromatic monoalkenyl alkyl halide corresponding to the formula:

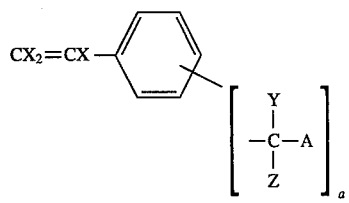

or

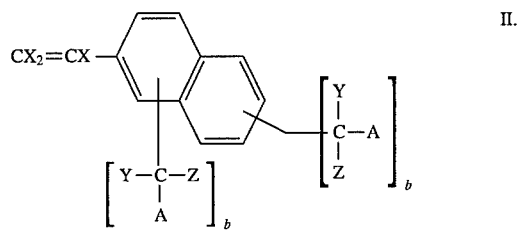

in which X is selected from the group consisting of hydrogen, chlorine, bromine and iodine; Y is selected from the group consisting of hydrogen, chlorine and bromine; Z is selected from the group consisting of hydrogen, chlorine and bromine and A is selected from the group consisting of hydrogen, chlorine, bromine and a $C_{1-3}$ alkyl group, with the proviso that, of Y, Z and A, at least one is chlorine or bromine and, where A is an alkyl group, at least one of Y and Z is chlorine or a bromine, and a=1 or 2 and b=0, 1 or 2, with the proviso that at least one b is at least 1; and
       0.5 to 10% by weight of at least one olefinically unsaturated monomer which is at least copolymerizable with the conjugated diene monomer and different from the aromatic monoalkenyl alkyl halide, wherein the halogen-containing polymer is partly saponified to the corresponding hydroxyalkyl compound,
   (B) an aromatic polynitroso compound containing at least two nitroso groups attached directly to non-adjacent ring carbon atoms,
   (C) one or more auxiliaries selected from the group consisting of pigments, carbon black, foam inhibitors, and emulsifiers, and
   (D) a partly saponified homopolymer or copolymer of vinyl acetate, said water-based binder dispersion being free from masked polyisocyanates.

13. A binder dispersion as claimed in claim 12 which, based on the dispersion as the whole, contains:
   5 to 20% by weight of the halogen-containing copolymer,
   2 to 20% by weight of the aromatic polynitroso compound,
   1 to 15% by weight of the partly saponified homopolymer or copolymer of vinyl acetate,
   0.2 to 15% by weight one or more auxiliaries selected from the group consisting of pigments, carbon black, foam inhibitors, and emulsifiers and
   balance to 100% by weight water.

14. A binder dispersion as claimed in claim 12 wherein from 40 to 98% of the acetate groups originally present in the homopolymer or copolymer of vinyl acetate have been saponified to alcohol groups.

15. A binder dispersion as claimed in claim 12 wherein the halogen-containing polymer contains polymerized units of monomers bearing carboxylic acid groups.

16. A binder dispersion as claimed in claim 12 wherein the halogen-containing polymer consists of:
   80 to 95% by weight polymerized units of 2,3-dichloro-1,3-butadiene monomers,
   2 to 10% by weight monomers selected from the group consisting of acrylic acid, methacrylic acid, and mixtures thereof and
   2 to 10% by weight polymerized units of vinyl benzyl chloride.

17. A binder dispersion as claimed in claim 12 wherein a dinitrosobenzene is used as the aromatic polynitroso compound.

18. A binder dispersion as claimed in claim 17 wherein 1,3-dinitrosobenzene, 1,4-dinitrosobenzene, or mixtures thereof are used as the aromatic polynitroso compound.

19. A binder dispersion as claimed in claim 12 wherein the halogen-containing polymer contains from 80 to 95% by weight polymerized units of 2,3-dichloro-1,3-butadiene.

20. A binder dispersion as claimed in claim 14 wherein from 80 to 90% of the acetate groups originally present in the homopolymer or copolymer of vinyl acetate have been saponified to alcohol groups.

21. A binder dispersion as claimed in claim 13 wherein from 80 to 90% of the acetate groups originally present in the homopolymer or copolymer of vinyl acetate have been saponified to alcohol groups.

* * * * *